March 1, 1932. H. P. VANNAH ET AL 1,847,318
MACHINE FOR TREATING PEANUTS
Filed Sept. 18, 1929  4 Sheets-Sheet 1

Inventors:
Harold P. Vannah,
Samuel W. Hauser.
Att'ys.

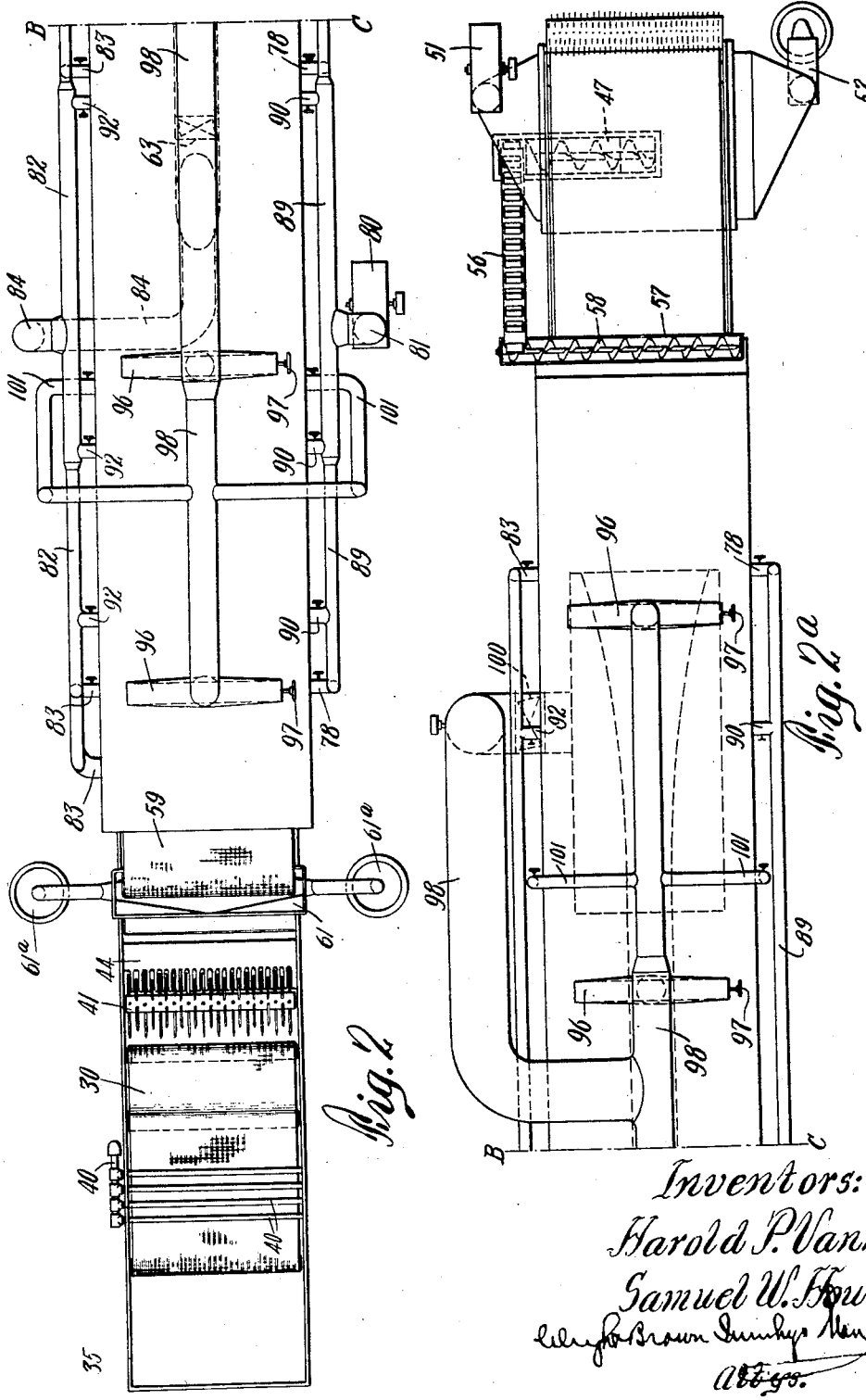

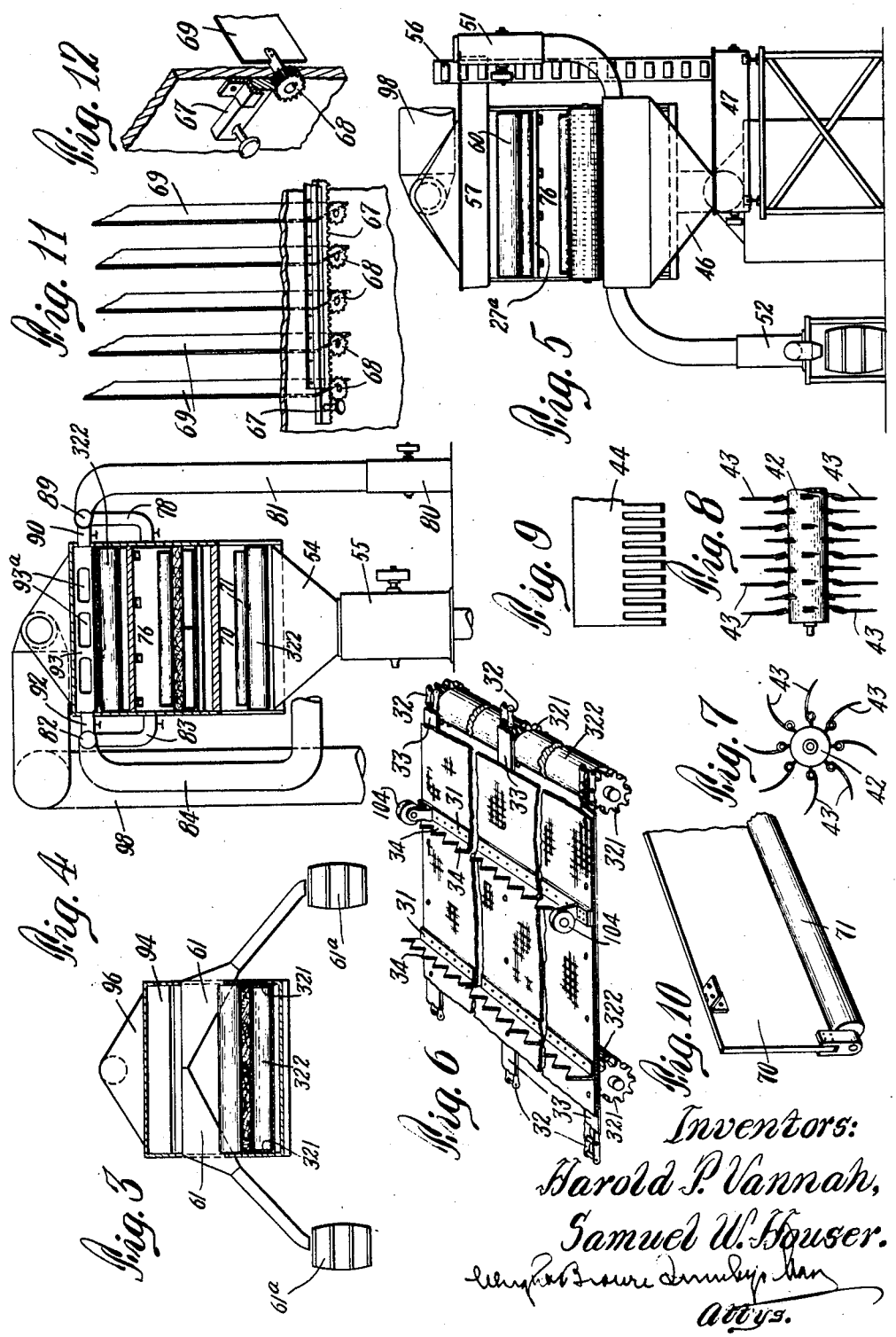

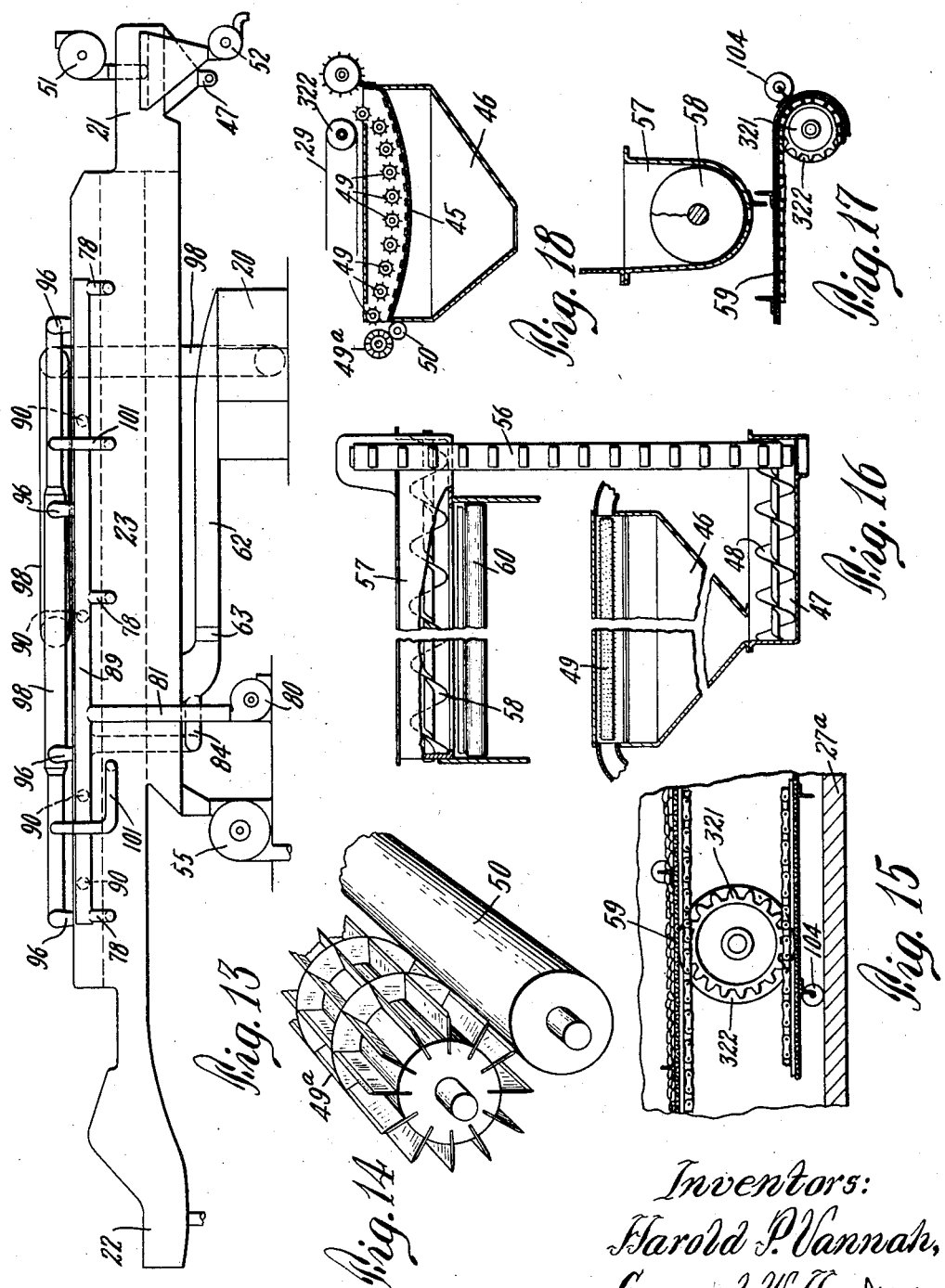

Patented Mar. 1, 1932

1,847,318

UNITED STATES PATENT OFFICE

HAROLD P. VANNAH, OF WEST PALM BEACH, AND SAMUEL W. HOUSER, OF ST. PETERSBURG, FLORIDA, ASSIGNORS TO BROWN COMPANY, OF BERLIN, NEW HAMPSHIRE, A CORPORATION OF MAINE

MACHINE FOR TREATING PEANUTS

Application filed September 18, 1929. Serial No. 393,417.

This invention has for its object to provide a machine for treating peanut plants and for recovering separately the dried nuts, stems and leaves.

In the harvesting of peanuts, greatest economies are secured by the utilization not only of the nuts, but of what may be termed the hay which is rich in proteins and can easily be made available as a cattle food. The best results can be secured by removing the entire plant from the soil carrying with it the nuts which are attached by the pegs, so-called, to the axils of the plant. Ordinarily, in the harvesting of such crops, the pulled plants are permitted to dry a few hours on top of the ground and then for a month, more or less, in stacks built around poles set in the fields, until the nuts are "cured"—meaning, become dry and conditioned for prolonged storage, without deterioration. Simultaneously, the stems and vines become "cured" in the same sense also, although the quality of the hay is not homogeneous from harvest month to harvest month or from year to year. It usually occurs, however, that by the time this "cured" condition is secured, the pegs are then in such a dry and brittle condition that the nuts can be separated from the dry vines. This procedure, however, is exceedingly wasteful, and it is not thereby made possible to conserve to the best advantage the stems and the leaves.

The growth of peanuts is distributed more particularly in those areas in which occur frequent rains during the period of harvesting. Consequently, where the plants are field-dried, the leaves, which contain a greater proportion of protein than the stems, become mildewed and rot and are lost. Fodder produced from foliage subjected to these conditions lacks the green color and the nutritious elements which are desirable in cattle foods.

The object of the present invention is to provide a method for the desiccation of the peanut plants and the recovery of the nuts and the vine and foliage, under conditions which ensure that the final products shall have substantially a constant moisture content, the skins, which surround the kernels, shall not be shrivelled and broken, the shells shall be uninjured, and the leaves and stems shall be in a condition so that they may be utilized in the production of a nutritious fodder, characterized by green color.

In growing peanuts in the Everglades region of Florida, a difficulty encountered in completing the harvest of the peanut crop is the continued excessive moisture of the vines, due to the frequent and heavy rains while the peanuts are curing in the ordinary method of using stacks, as a result of which, should one dry the plants by that method, the stacks of plants are wetted, over and over, the leaves drop from the stems and if they do not fall on to the ground and become lost thereby, they remain as mildewed or rotted material throughout the stack.

By reason of experimentation and practical experience it has been found to be possible to conserve practically the entire plant and to ensure the production of practically perfect shells having therein kernels enclosed in unbroken and unwrinkled skins and having a predetermined moisture content of say 10% and at the same time to recover the stems and vines with a maximum protein content and with a predetermined moisture content of say 10%, without the presence of rot or mildew. Unless this is accomplished, commercial values are lost in raising peanut crops in such regions as are found in the Everglades lands in Florida, and yet, on the other hand, such regions lend themselves more particularly to the growth of peanuts having a high oil content in the kernel and a high protein content in the stems and foliage and a high poundage for each acre. One of the reasons why these lands have been economically unprofitable in raising peanut crops has been due to the lack of proper methods and machinery for utilization when the crops are harvested.

The drying of the plants, including the stems, leaves and nuts, by a machine drying process in place of the ordinary method of using stacks, presents a difficult problem. It is not practical or feasible to separate the nuts from the plants while they contain the moisture content characteristic of the plants as soon as they have been drawn from the soil. Again, the foliage and stems may be dehydrated with certain factors of heat and time, but, when the nuts are subjected simultaneously to these same factors, they are not properly dehydrated. Again, when it is remembered that the nut comprises a fibrous hull and oil-containing meats or kernels enclosed within a somewhat impervious smooth integument or skin, the removal of the moisture content without causing a wrinkling or breaking of the skin is not easy of accomplishment. Moreover the hulls should not be broken or injured and the skins should not be broken, as otherwise the kernels quickly become rancid and unfit for use.

Not only is one of the objects of the present invention the recovery of the nuts and vines, as has hereinbefore been pointed out, but another important object of the invention is to effect it rapidly and economically without subjecting the plants, after they have been drawn from the earth, to the action of the elements. Ordinarily in harvesting the crops, particularly when the peanuts are grown in muck soil, a quantity of muck remains in adherence to the nuts, and it is much more difficult to remove it after the soil is dry in the form of a crust than when it is in its moist natural condition.

Various driers have been proposed to be utilized in connection with crops of a grassy nature, including alfalfa and the like, but they are inapplicable for use in the case of the peanut plant. Speaking generally, the procedure which is followed in the practice of the present invention is first to subject the whole plants to a partial desiccation, sufficient however, to make the pegs brittle enough to allow the separation of the nuts from the remainder of the plant. This is accomplished by conducting the plants through a chamber to which is delivered heated air, preferably in counter-current flow to the plants, so that in a given time the object is accomplished. Then, by means of a suitable threshing machine to which the whole plants are delivered, the nuts are separated and the greater portion of the leaves removed from the remainder of the plant, which then comprises the stem and the roots. At this point, the leaves which have been separated are in a condition to be immediately ground together with previously obtained dry vines and roots, and they impart to the finished fodder product a desirable green color. The nuts and the stems to which the roots are still attached are then desiccated under different conditions of moisture and temperature. The desiccation of the stems to a point where they contain substantially 10% moisture may be rapidly accomplished. This may be done at a higher temperature than that to which the whole vines and nuts are subjected. On the other hand, the nuts must be subjected to a relatively low temperature in proper humidity conditions, for a relatively long time, to permit the gradual removal of the moisture, before they are dehydrated to a point where the kernels and the nuts and the hulls have a moisture content of say 10%. A single drying apparatus may be utilized for the entire operation of dehydration, although this is not necessarily essential, but there are great economies in using such an apparatus. Obviously the desiccation should be gradual, notwithstanding the fact that the time factors for the whole plants, the vines and the nuts may vary greatly. For example, the initial dehydration may be accomplished, using the proper temperature, in a period of about 1 to 1⅓ hours, more or less, stems may be desiccated in 20 minutes, and the nuts require a period of from 4 to 6 hours. The apparatus, which is preferably used for the dehydration, comprises an elongated drying chamber which is divided into horizontal zones by partitions, so that in each zone there may be arranged to travel a suitable form of conveyor upon which is spread the material undergoing drying. By causing the drying medium, that is the heated air or the products of combustion, to travel through the drier in one direction and then through the different zones in the opposite direction, or by moving one conveyor in one direction and the others in different directions, to secure counter-current flow of the material and air through the drying chamber,—hot air from a single heater may be employed. There is an advantage in utilizing the air which has been employed in drying the whole vine for dehydrating the nuts, inasmuch as it is possible to secure thereby proper conditions of humidity in the air to which the nuts are subjected.

There will be hereinafter described a particular condition which for optimum results should be present in each of the various zones or compartments of the drier.

In most cases it is preferable to subject the whole plant to a washing operation with water for the removal of the soil which is adherent to the leaves, roots and nuts. This may be accomplished by arranging a tank at one end of the drier, into which the plants as brought in from the fields may be dumped and from which the washed plants can be conveyed to and arranged in a fairly thick mat on the conveyor on which they are distributed and carried through the drier to the thresher arranged at the other end of the drier. Any convenient means may be utilized for ensuring a fairly thick layer of the plants upon the conveyor or carrier, this being facilitated in a measure by the fact that the plants carry considerable free water with them and they are sufficiently heavy to form a mat of the desired depth or thickness. On the other hand, the layer is, to a considerable extent because of the character of the plant, sufficiently open to permit the passage of the heated air through the layer and thus reach all of the component parts thereof. The thresher is preferably located at the end of the drier opposite to the wash tank so that the partially dehydrated plants may be delivered directly thereto for the separation and removal of the nuts from the pegs. The other carriers of the drier travel in a direction opposite to that of the carrier for the whole vines, and the stems and the nuts may be delivered from the thresher directly to the carriers, by which they are re-transported through the drier and subjected for the proper length of time to the dehydrating temperatures and humidity. The stems, after being dried to a predetermined moisture content, are fed, together with the dried leaves from the stacker, into a grinder, so as to be thoroughly admixed and ground together to form a cattle fodder. Such fodder, as produced from the muck lands of the Everglades, carries a protein content as high as 24% and furnishes a palatable and nutritious food for cattle. To such fodder, of course, is added such other ingredients as salt, molasses and the like, as are necessary for binding the mass together and to furnish the other necessary ingredients of cattle fodder.

Referring once more to the dehydration of the nuts, the removal of the moisture must of necessity be gradual, and that which is contained in the kernel must pass out through the skin or integument by which it is enclosed and also through the fibrous hull. This must be accomplished without permitting condensation of the moisture within the hull.
If the kernels are subjected to high heat, they tend to swell and thus cause a rupture of the skin with the subsequent wrinkling thereof as the kernel contracts, after the removal of the moisture content. The hulls, on the other hand, give up their moisture quite readily because of their porous, fibrous structure. Optimum conditions for effecting drying of the nuts require initially a relatively low temperature with a high degree of humidity, followed by an increase in temperature and a decrease in humidity. These conditions are met in the drier which is herein illustrated for the purpose of practicing the present invention. It may be stated in general that substantially the temperature of 110° F. and a relative humidity of approximately 80% is maintained in one end of the drying chamber, and the temperature is gradually raised to approximately 130° to 140° F., with a decrease in relative humidity to approximately 50%. Of course, in any event it is essential that the temperature should be kept so low as not to parch the nuts. Temperatures which we have stated, however, are subject to modification, dependent upon whether or not the nuts are to be used for table purposes or for seed. In the latter case, it is necessary that the temperature should be so low as not to affect the germ, which must not be over 100° F. until the moisture of the nuts has been reduced to 15% when it may then be raised to 140° F. and when the moisture has been reduced to 12% the temperature may be raised to 160° F. and when the moisture has been reduced to 10% the temperature may be raised to 180° F.

On the accompanying drawings are shown more or less conventionally and diagrammatically an apparatus embodying our invention.

Figures 2 and 2a represent a plan view of the same.

Figure 3 represents a section on the line 3—3 of Figure 1, at the delivery end of the nut conveyor.

Figure 4 represents a transverse section on the line 4—4 of Figure 1.

Figure 5 represents an end view of the apparatus.

Figure 6 represents a portion of on of the conveyors, such as may be employed.

Figures 7 and 8 illustrate a transfer device which assists in matting the plants on a conveyor.

Figure 9 represents a portion of a slotted guide plate which also strips the vines from the transfer device.

Figure 10 illustrates one of the swinging baffles, which are employed in the heating chambers.

Figures 11 and 12 illustrate movable louvres such as are employed for controlling the passage of air into and out of the drying chambers, and the means for operating them.

Figure 13 represents on a small scale a side elevation of the entire apparatus.

Figure 14 illustrates conventionally means for reducing the stems to relatively short lengths.

Figure 15 shows a portion of one of the conveyors such as may be used and one of the sprocket wheels cooperating therewith.

Figure 16 illustrates mechanism for receiving the nuts from the thresher and conveying them to the conveyor for further drying.

Figure 17 illustrates a device for distributing the nuts on the conveyor.

Figure 18 represents conventionally a section through the thresher by which the nuts are separated from the stems and leaves.

Figures 1, 1A:
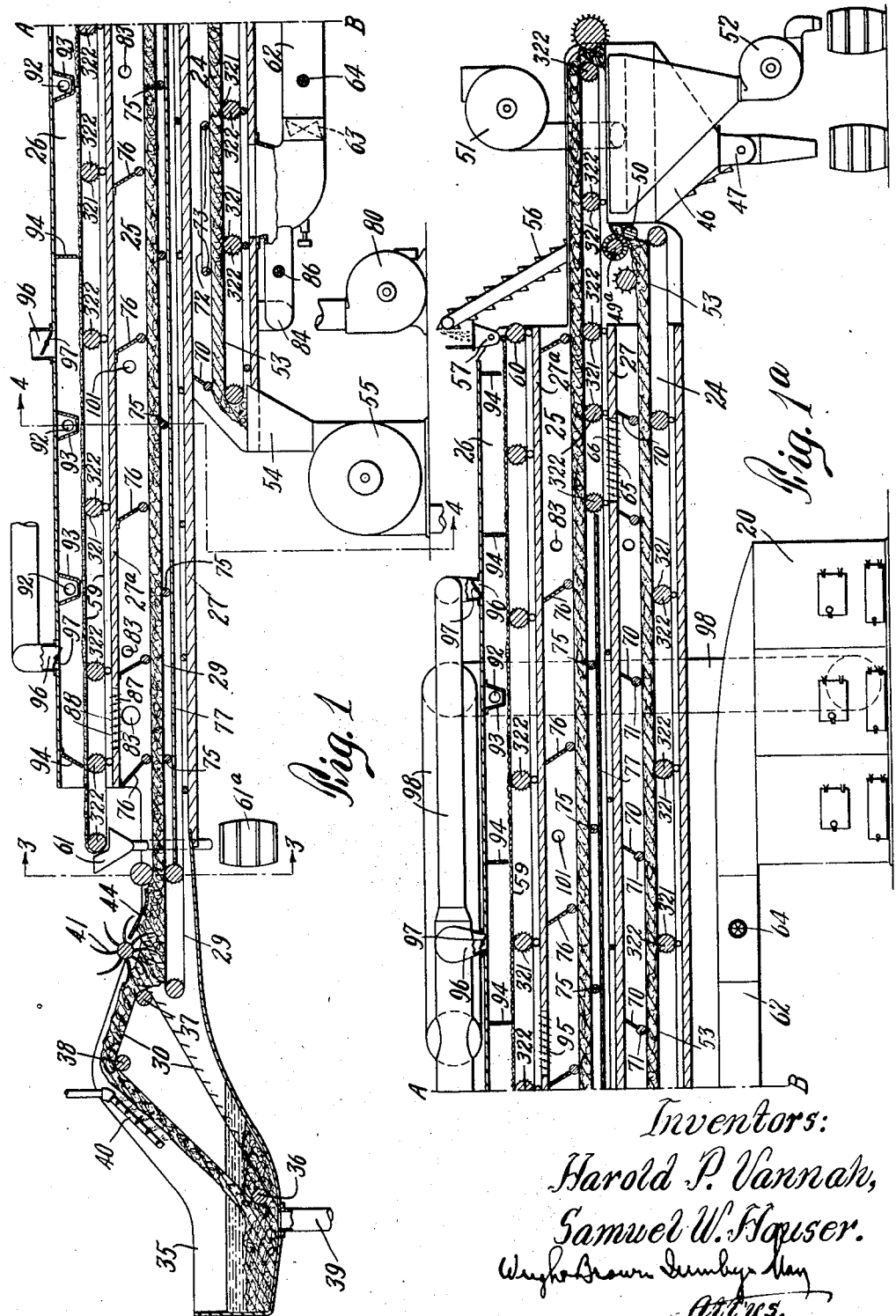
Figures 1 and 1a represent a longitudinal section through the apparatus.

It should be pointed out initially that, because of its size, the apparatus has been shown conventionally and more or less diagrammatically, and no attempt has been made to show the various parts or instrumentalities in their relative sizes or in detail, as these may be varied according to circumstances or to the location of use of the apparatus.

At some convenient point there is located a source of heat, which may take the form of a furnace of any suitable construction and adapted for any convenient suitable fuel. This furnace is for the purpose of affording a volume of heated air and gaseous products of combustion, for use in effecting the dehydration of the various portions of the peanut plants. By suitable conduits, blowers, etc., a stream of hot air, tempered or moistened as desired, is caused to travel through the various chambers wherein are located the conveyors for the whole plants, the nuts and the stems respectively. Again, there is a suitable thresher, so located as to receive the partially dried plants, to separate the nuts from the stems and leaves and to deliver the nuts, leaves and stems separately so that the nuts and stems may be further dried. Any suitable commercial threshing machine may be used for this purpose, together with the necessary conveying apparatus.

Referring first to Figure 13, the furnace is indicated conventionally at 20 and the thresher at 21. At the end of the apparatus opposite the thresher is indicated at 22 a washer for removing loam or soil from the plants and especially from the nuts. Between the washer and the thresher, and indicated as a whole at 23, there is a long casing of a length of many feet. This casing is divided longitudinally by horizontal partitions into three long tunnels or drying chambers, one of which, since it is used for finally drying the stems, may be, if desired, much shorter than the others. Figure 13 also shows various air conduits, blowers, etc. which will be referred to in the following description. The casing is made of any suitable materials and is preferably insulated to prevent loss of heat, but, since a wide choice is afforded of materials for this purpose, it is unnecessary to describe the wall construction in detail.

The three tunnels or drying chambers are indicated at 24, 25 and 26, afforded by the horizontal parallel partitions 27 and 27a. In the intermediate chamber there is an endless conveyor 29 to which are delivered the whole plants. This projects through the entrance end of the tunnel as shown in Figure 1, to receive the plants from a conveyor 30 after they have been washed. The conveyor 29 is formed of any suitable open-work or foraminous material through which air may be passed, such for example as shown in Figure 6. Closely meshed poultry wire of suitable strength, braced by cross bars as at 31 and connected to sprocket chains 32, may be employed for the purpose. Longitudinal bands of belting or metallic ribbons 33 may be employed for strengthening the wire fabric and affording means for securing the sprocket chains thereto. But, of course, any other suitably constructed conveyor of open mesh construction may be employed in lieu of that described. This conveyor is preferably provided with teeth or prongs or the like to engage the plants, such as those formed by the serrated cross bars 34. The conveyor is supported by suitable spaced sprockets 321 and rolls 322 throughout its length, and power is applied from a suitable source to one or more sets of the sprockets to cause the conveyor to be moved at the desired speed through its tunnel. At the receiving end of the conveyor there is a spiked conveyor 30, previously referred to, which removes the plants from a tank or receptacle 35 to which they are delivered when brought in from the field. Power is applied to this conveyor from a suitable source. It is conventionally shown as supported by the rotary members 36, 37, 38 to travel in a substantially triangular path. If desired, the tank may contain a pool of water, but ordinarily the water and sludge which collects therein is drained away through the outlet 39. As the plants are picked up by the spiked conveyor and carried in the direction of the arrow in Figure 1, they are washed by jets of water delivered from a plurality of nozzles conventionally illustrated at 40. Any suitable number of nozzles for the purpose are employed and water is delivered thereto under the necessary pressure to wash the adhering soil from the plants.

A suitable transferring mechanism is employed for the plants from the elevating conveyor 30 to the drying conveyor 29. This may be made in any desired form, not only to act as a transfer device, but also to assist in matting the plants on the conveyor 29 to form a matted layer of suitable thickness thereon. The transferring device is more or less conventionally shown as a whole at 41 and comprises a roll 42 rotated by suitable means, and having a plurality of spring fingers 43 (see Figures 7 and 8) to engage the plants in proximity to the roll 37, to strip them from the spike conveyor 30 and to pass them under a slotted guide and pressure plate 44 (see Fig. 9). The conveyor 30 travels at a higher rate of speed than the conveyor 29, and the transfer roll rotates at a sufficiently high speed to cause the spring fingers to remove the plants and pack them between the conveyor 29 and the guide and pressure plate 44. A mat of plants is thus formed on the slowly moving drier conveyor 29 and is carried thereby through the tunnel or elongated chamber 25 to the thresher 21 located beyond the exit end of the chamber.

The thresher, as has been stated, may be of any suitable commercial type. It is conventionally shown in Figure 18 as having a slatted bed 45, through which the separated nuts pass into a hopper 46 and thence to a conveyor trough 47 having therein a worm conveyor 48. Picker rolls of the ordinary construction, as conveniently shown at 49 (Figure 18), separate the stems, leaves and nuts, the nuts passing through the slatted bed 45, the stems being delivered to a chopping roll 49a and a bed roll 50 (see Figure 14, by which instrumentalities they are cut into short lengths), and the leaves being blown out by a winnowing fan 51 and delivered to a mill 52 by which they are ground or comminuted.

The stems and particularly the nuts require further drying, and they are delivered to conveyors and passed through drying chambers or tunnels for this purpose. The stems, which have been denuded of nuts and leaves, are deposited from the cutters to an endless openwork or foraminous carrier 53, which passes through the lowermost drying tunnel or elongated chamber 24. Since a higher drying temperature is used, this tunnel is relatively short as shown in Figure 1, and the dried stems are shown therein as being delivered to the hopper 54 of a suitable grinding mill 55, which is conventionally illustrated. Of course, instead of providing two mills for the leaves and stems, one mill, to which both elements of the plant may be delivered by conveyors to be ground together, may be provided.

The nuts which are delivered from the stacker are transported from the delivery end of the conveyor trough 47 by an endless bucket conveyor 56 or other suitable form of elevator to a distributing instrumentality or spreader indicated at 57. This is conventionally shown as comprising a slotted hopper provided with a worm 58 (see Figure 17) which causes the nuts to be fed along the semi-cylindrical bottom of the hopper and delivered to and uniformly spread upon a conveyor 59. This conveyor is of openwork or mesh construction with meshes of such size that the small nuts will not pass through it. This belt or conveyor, like the other drying belts hereinbefore referred to, is suitably braced and strengthened, and is connected to sprocket chains tracking on suitably spaced sprockets (indicated conventionally at 60), of which one or more sets are rotated from any suitable source of power. The conveyor is moved at slow speed, so that the nuts will be subjected to the drying atmosphere for a relatively long time, say 3 to 5 hours, while the carrier for the stems is moved at a much higher speed. In fact, the tunnel for the stems may be so short and the speed of travel of the stems may be sufficiently rapid that, with the relatively high temperature of the drying atmosphere, the stems may be treated for a short period of time, say 20 to 30 minutes.

Upon the conveyor for the nuts, the latter may be deposited in a layer of, say, 2 inches; whereas on the whole plant conveyor the mat may be from 8 to 12 inches, more or less, in thickness. At the delivery end of the nut-drying tunnel 26, the conveyor 59 may deliver the nuts to a suitable hopper 61 and thence to a receptacle 61a.

From the description thus far given, it will be noted that the acting or supporting stretches of the conveyors 53 and 59 move to the left in Figures 1, 1a, and the supporting stretch of the intermediate or plant-carrying conveyor moves in the opposite direction or to the right. By this arrangement, and by reason of the described movements, it is possible to cause a current of air to travel through the three tunnels in series in counter direction or flow to the direction or flow of movement of the conveyors and the materials carried thereby. Since the stems may be subjected to the highe : temperature, the furnace-heated air is delivered to the exit end or left end of the lowest or stem-drying tunnel, and, after passing therethrough, may be passed to the delivery or right end of the intermediate or plant-drying tunnel, and, after traversing the latter, may be delivered to the left or delivery end of the highest or nut-drying tunnel, in a continuous stream, and yet always pass the materials being dried in a counter-current direction. Of course there should be a flexibility of control of the temperature of the drying atmosphere. That is, it should be possible to increase or decrease the temperature of the air passing through any one of the tunnels, by tempering it with cool air, or by mixing hotter air therewith; and we have indicated conventionally or diagrammatically means for accomplishing this. Likewise suitable baffles should be provided for causing the stream or streams or air to pass through the materials on the several conveyors, and fans or blowers may be used where needed to secure the desired flow and/or admixture of hot and cool air. Again, there are certain economies which may be effected by returning a portion of the warm air to the furnace to be reheated.

The furnace 20 has a stack or conduit 62 for hot air and gaseous products of combustion, which delivers the heated atmosphere to the delivery end of the lowermost stem-drying tunnel 24 as shown in Figure 1. A fan or blower 63 is conventionally shown in dotted lines, Figure 1, for ensuring a constant stream of the heated atmosphere. Suitable damper-controlled ports 64 are provided in the conduit to admit cool air in advance of the fan, to ensure that the temperature of the atmosphere when it enters the tunnel will not be excessive. Near the extreme end of the tunnel 24 and in the partition 27 there is a larger port 65 for the exit of the air, and this is controlled by a louvre-damper indicated as a whole at 66, which may be operated by any suitable mechanism, such as a slidable rack 67 having teeth to engage pinions 68 on the ends of the louvres 69 (see Figs. 11 and 12). It is desirable that the current of air should travel in a tortuous course and pass up and down through the stems on the conveyor 53, and staggered baffles of any suitable kind are provided for this purpose. They may take the form of rolls 322 below the upper stretch of the conveyor, on the same shafts as the operating sprockets 321; and of flexible members 70 depending from the horizontal partition 27, and having their lower free edges provided with rolls 71, if desired, (see Figure 10) resting upon the stems on the conveyor. In lieu of these two forms of baffles, any others which will serve the purpose may be employed. To prevent the stems from being blown from the conveyor as it passes the delivery end of the conduit 62, an open fabric belt 72 mounted on operating rolls 73 may be located in the tunnel 24, immediately over the delivery end of said conduit and spaced over the conveyor 53. When the stream of heated air and gaseous products of combustion enters the delivery end of tunnel 24, it passes and repasses in a tortuous course through the stems on the conveyor 53 and then enters the tunnel immediately thereabove near the delivery end of the plant conveyor therein with the temperature substantially diminished.

The tunnel 25 for the whole plants is likewise provided with staggered baffles 75, 76 substantially like those located in the tunnel below it, to cause the stream of air to follow a tortuous path and pass and repass through the matted vines or plants on the conveyor 29. In addition, there may be located between the stretches of the conveyor a plate 77 extending longitudinally of the tunnel and from side to side thereof to keep the stream of air close to the under face of the upper stretch. It is necessary, or at least desirable, to cause an additional quantity of air to be passed into the intermediate tunnel either for cooling or increasing the temperature of the main current of air. Suitable ports in the side of the tunnel are provided, with which are connected valved branch pipes 78 leading from a manifold 89 located on one side of the casing and supplied with cool air by a fan or pump 80 through a conduit 81. On the other side of the casing there is a manifold 82 having valved branch pipes 83, and supplied with hot air through a conduit 84 leading from the main hot air conduit 62. This conduit 84 may have a suitable number of damper controlled ports 86 for admitting external tempering air. By these means, the stream of air entering the intermediate tunnel may be augmented, and its temperature raised or lowered at different points or lines along the travel of the conveyor therein. Near the entrance end of the tunnel or chamber 25 there is a large port 87 with a louvre damper 88, substantially like that previously herein described, which permits the passage of air therefrom into the uppermost drying tunnel or chamber through which the nuts are passed.

As thus far described, it will be seen that the hot air, after leaving the lowermost tunnel at the entrance end thereof, enters the delivery end of the intermediate tunnel, wherein, as it travels through the latter, passes in counter-current direction to and through the mat of vines or plants on the conveyor in the intermediate tunnel and is discharged into the delivery end of the uppermost tunnel or drying chamber, wherein it is utilized to dry the nuts. By reason of its contact with the freshly pulled plants, particularly when they have been subjected to a washing operation, the stream of air in the intermediate chamber 25 is charged with more or less moisture, which conditions it for drying the nuts. But in the nut-drying chamber or tunnel 26 it is desirable to effect a flexible control of the temperature and humidity of the stream of air thereon. The latter may be augmented by hot or cold air respectively by valve-controlled branch pipes supplied with hot or cold air as the case may be. For cold air there is a manifold 89 supplied from the conduit 81, and having valved branch pipes 90 leading to ports in the side of the tunnel 26; and for hot air there is a manifold 82 with valved branch pipes 92, and supplied by the conduit 84 (see Fig. 4). The ports in the side walls of the tunnel 26 communicate with hollow stationary baffles 93 extending between said side walls and having numerous slots or apertures 93a (see Fig. 4) for the emission of the air delivered thereto. These baffles may be supplemented along the conveyor by additional baffle plates 94 likewise located above the upper or operative stretch of the nut conveyor 59. Below the last-mentioned stretch of the conveyor are baffles 60,—i. e. the rolls on which the conveyor rests. To increase the humidity of the air in the upper tunnel, there may be one or more openings through the partition 27a which separates the tunnels 25, 26, as indicated for example at 95, provided with louvre dampers to permit the entrance of warm moist air from the plant-drying tunnel into the nut-drying tunnel intermediate the ends thereof. In the top wall of the nut-drying tunnel there are vent ports 96 controlled by dampers or valves 97, and communicating with an exhaust pipe 98 leading to the furnace 20 below the fire therein or vented to the atmosphere if desired. Fans or pumps indicated at 100 are shown as located in the exhaust pipe to withdraw the tail air from the nut-drying tunnel, and to ensure the maintenance of a constant stream of air through the three tunnels or drying chambers. It may be here stated that the intermediate or plant-drying tunnel may also be connected, at intervals, with the exhaust pipe 98 through dampers, or valve-controlled pipes 101, to remove some of the air therefrom. It will be understood that the number and location of the vents leading from the tunnels to the exhaust, or vent pipe 98 may be varied as desired, and also that, by means of the valves or dampers controlling the inlet ports for the hot, cold and/or humid air, and the vent or discharge ports, it is possible to maintain the temperature and humidity conditions which are required in the three drying chambers. Thus, by the control thereby afforded, a stream of relatively humid air at the desired relatively low temperature may be caused to pass in counter-current flow to the nuts which are slowly conveyed through the uppermost tunnel 26, and dry them to a substantially constant moisture content of substantially 10%.

The machine as thus described is capable of many changes and refinements, and has been shown in its simplest form.

The conveyors should be made suitably strong to support the weight of the materials carried thereby, and, if desired, they are provided with rolls 104, see Figure 6, to travel along rails or guideways (not shown) on the tunnels and thereby support the stretches thereof.

As has been previously stated, the invention which forms the subject-matter hereof, is capable of various embodiments, and various equivalents may be employed for the instrumentalities which are conventionally illustrated.

In general, the temperature of the air stream or current as it passes in sequence through the stem-drying, plant-drying and nut-drying chambers or tunnels, and the speed of travel of the plants, stems and nuts through the chambers or tunnels, are so regulated and controlled that the pegs are sufficiently dried to permit the easy separation of the nuts, stems and leaves, with the leaves in a sufficiently dry condition, the stems then dried to about a 10% moisture content, and the nuts dried to a like moisture content, without rupturing the shells or skins or causing the wrinkling of the skins or shrivelling of the nuts. While we have mentioned 10% as the desirable final moisture content, this is not to be understood as meaning that the predetermined moisture content may not be more or less as may be desired.

Having thus explained the nature of the invention and the principles of the operation of the machine which has been illustrated and described as constituting one embodiment thereof, without attempting to set forth all of the forms in which it may be made or all of the modes of its use, what is claimed is:—

1. An apparatus for treating peanuts, comprising three parallel elongated drying chambers arranged in superposed relation, means for causing a stream of heated air to flow through said chambers in sequence starting with the lowermost chamber, conveyor mechanism for carrying the whole plants through the intermediate drying chamber, means for carrying separated nuts and stems through the upper and lower chambers respectively, and instrumentalities at the end of the intermediate chamber for receiving the whole plants, separating the nuts and the vines, and delivering the separated nuts and vines to the upper and the lower chambers respectively.

2. A machine for drying peanut crops, comprising in combination three tunnels arranged one over the other, means for causing a stream of drying atmosphere to flow sequentially through said tunnels but in opposite directions beginning with the lower tunnel, means for moving the crop including stems, leaves, and nuts as a mat through the intermediate tunnel, means for segregating the nuts from the stem and leaves at the delivery end of said intermediate tunnel, means for moving the nuts as a layer through the upper tunnel in a direction opposite to that of the crop, means for moving the stems as a layer through the lower tunnel in a direction opposite to that of the crop, means for transferring the segregated nuts from the delivery end of said intermediate tunnel to said nut-moving means in said upper tunnel, and means for transferring the segregated stems as a layer from the delivery end of said intermediate tunnel to said stem-moving means in said lower tunnel.

3. A machine for treating peanut crops, comprising an elongated drying tunnel and an associated endless conveyor for carrying the whole peanut plants from the intake end to the exit end of said tunnel, means for progressively segregating the nuts from the stems at the exit end of said tunnel, separate elongated drying tunnels and associated endless conveyors for said nuts and for said stems, means at the exit end of said first-mentioned tunnel for progressively transferring said nuts and stems to their respective conveyors, and means for causing a single stream of heated air to flow sequentially through said stem, whole plants, and nuts tunnels in counter-current flow to the material being conveyed through each of said tunnels.

4. A machine for treating peanut crops, comprising an elongated drying tunnel and an associated endless conveyor for carrying the whole peanut plants from the intake end to the exit end of said tunnel, means for washing said whole plants adjacent to said intake end and including a washing basin into which said plants may be dumped and a conveyor for picking up said washed plants and discharging them onto said tunnel conveyor, means for segregating the nuts from the stems at the exit end of said tunnel, separate elongated drying tunnels and associated endless conveyors for said nuts and for said stems, means at the exit end of said first-mentioned tunnel for progressively transferring said nuts and stems to their respective conveyors, and means for causing a single stream of heated air to flow sequentially through said stem, whole plants, and nuts tunnels in counter-current flow to the material being conveyed through each of said tunnels.

In testimony whereof we have affixed our signatures.

HAROLD P. VANNAH.
SAMUEL W. HOUSER.